L. Raecke,
Filter.
No. 111,001.  Patented Jan. 17, 1871.
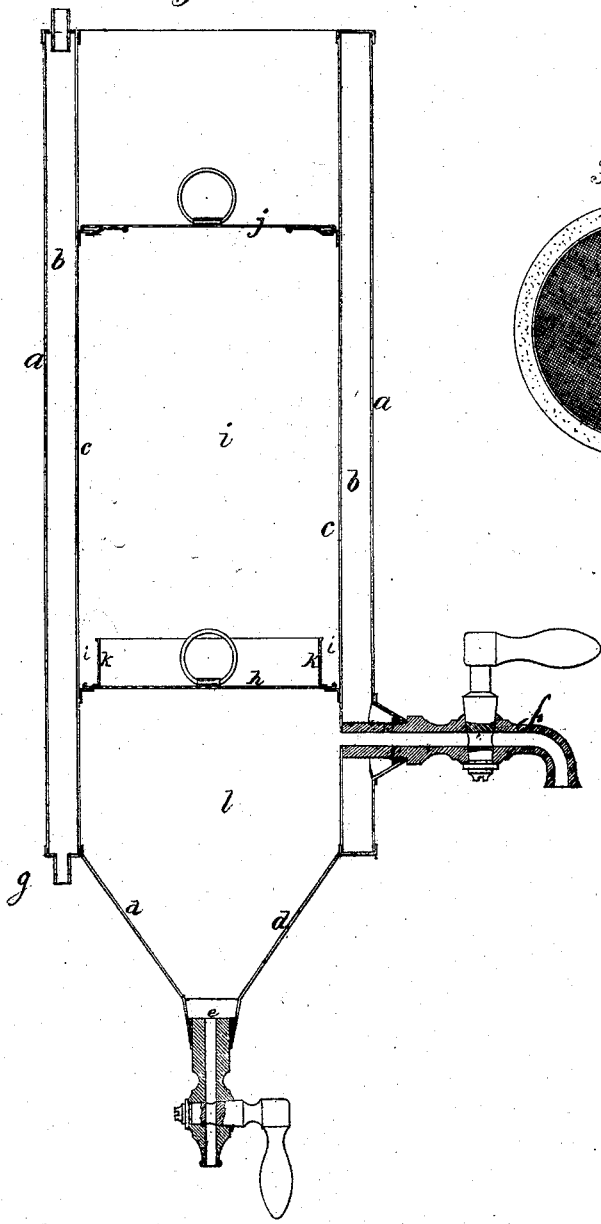
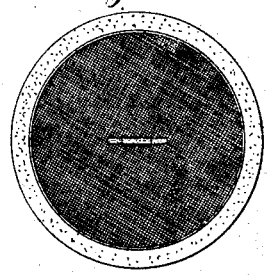

UNITED STATES PATENT OFFICE.

LOUIS RAECKE, OF NEW YORK, N. Y.

IMPROVEMENT IN FILTERS.

Specification forming part of Letters Patent No. 111,001, dated January 17, 1871; antedated January 7, 1871.

I, LOUIS RAECKE, of the city, county, and State of New York, have invented a certain Improvement in Filters, of which the following is a specification.

Nature and Object of the Invention.

The invention belongs to that class of filters in which the filtering medium is composed of wool, cotton, felt, or other fibrous material, held in place by a sieve at the top and bottom in a vessel with solid sides, and through which the liquid is passed with or without pressure, and in a heated or unheated state.

The first part of my improvement consists in the structure of a vessel containing the filtering medium, which is formed of cylindrical shape, terminating at the bottom in a cone. Near the top is a shoulder, upon which rests the upper sieve or strainer. This sieve is caught or hooked to the shoulder by a hook, spring, button, or any equivalent device. Under this sieve is the filtering material—wool, cotton, felt, or any fibrous mass—supported at the bottom by a second sieve. This second sieve rests upon a shoulder projecting from the inner side of the cylinder, and may or not be fastened, as in the former case. At the bottom of the cone is a faucet for drawing off any filtered liquor that may remain impure after having passed through the filter. At or near the junction of the cylinder and the cone, and below the second sieve, is another faucet, for drawing off the pure liquor after filtration.

The upper sieve is placed about one-third the height of the cylinder from the top. The lower sieve is near the junction of the cylinder and cone.

The second feature of my invention consists in the construction upon the second sieve of a flange, which runs around (about one or two inches from the walls of the cylinder) the whole circle, and rises perpendicular to the surface from one to three inches, according to the size of the vessel.

The third feature of my invention consists in packing the filtering material densely between the flange above named and the walls of the cylinder, to prevent the liquid from flowing along the sides of the cylinder and passing through the sieve without filtration.

The fourth part of my invention consists in inclosing the above-described vessel in another vessel, leaving a space between the two for holding hot water or steam, with which the liquid to be filtered can be heated, if required.

Description of the Accompanying Drawing.

Figure 1 is an upright sectional view of the filter by a line drawn through the center. Fig. 2 is a view of the lower sieve and flange.

$a$ is the outer cylinder or vessel to contain the hot water or steam. This should correspond in shape with the inner vessel or filter, and the most convenient form for both is cylindrical, though the shape is not important. It should be made so much larger than the filter that the space $b$ in the drawings, between the two, will hold water or steam sufficient to impart to the liquid to be filtered the necessary degree of heat.

$c$ is the inner or filtering vessel, containing the sieves and filtering material. Its lower extremity terminates in or joins upon a cone, $d$, which is designed to receive such liquid as may be found to be impure after passing through the filter.

Sometimes the filtering material, even though new or freshly washed, will contain and impart to the liquid passing through it impurities. In such case this impure liquid should be allowed to run down into the cone $d$ and pass out of the faucet $e$ in the apex of the cone, made for this purpose.

Within the vessel $c$ are placed two sieves, $h$ and $j$. One, $j$, nearest the top of the vessel, rests upon two knobs or shoulders in the sides of the cylinder, and may be fastened with hooks or buttons or other device. The other sieve, $h$, is placed an inch or two above the junction of the cone and the cylinder, and rests upon knobs or shoulders fixed in the walls of the cylinder.

Parallel to and one or two inches from the outer edge of this sieve, and rising at right angles to its surface, is fixed a stiff flange, $k$, from one to three inches high. This flange must be sufficiently stiff to bear the pressure occasioned by densely packing the filtering material in the space $l$ between it and the walls of the cylinder.

Between the two sieves $j$ and $h$ the space $i$ is filled with wool, cotton, or other fibrous material or felt, packed with sufficient density to insure the purification of the liquid passed through, and at the same time not to prevent its free passage.

One feature of my invention which I esteem of great importance is the mode of packing the filtering material in that part of the space $i$ which lies between the flange $k$ and the walls of the cylinder.

One difficulty of frequent occurrence in filtering is the tendency of the fluid to find a passage along the walls of the vessel and out the sieve in an unfiltered state. I obviate this by packing the space $i$ very closely with the filtering material—so closely that, though the fluid to be filtered may, and probably will, run down along the walls of the cylinder in an unfiltered condition, yet when it comes to this point it will be and is forced, by the density of the packing, to pass away from the walls and find a passage through the filtering material, and come out pure, drawn with the rest of the liquor through the faucet $f$, provided for that purpose.

If the substance to be filtered requires to be softened or made thinner by an increased temperature, then hot water or steam can be applied, in any convenient manner, between the inner and the outer walls. When this is not required the inner or filtering vessel can be used without the outer case.

The size of the flange and the distance it is placed from the wall of the cylinder must be adjusted to the size of the filter. In a filter fifteen inches high and six inches in diameter I make the flange about one and one-quarter inch high, and place it one inch from the side of the cylinder. If the filter is larger, the flange and space should be altered accordingly.

$g$ is a faucet for drawing hot water from the space between the two vessels.

I claim, and desire to secure by Letters Patent, the following, viz:

1. In a filter, a sieve constructed with a flange so placed on its surface as to leave a space between the said flange and the walls of the filtering-vessel.

2. Packing the space between the flange $k$ and the walls of the cylinder so closely with the filtering material as to prevent the fluid from passing down the said walls and out the sieve in an impure state.

3. A filter constructed and arranged as hereinbefore described—viz., having two sieves, with a filtering material of wool, cotton, felt, or other fibrous material between the same, and the lower sieve having on it a flange, $k$, all combined with the vessels $a$ and $c$, all as and for the purposes described.

L. RAECKE.

Witnesses:
CHARLES E. SOUTHER,
MICHAEL PHILLIPS.